(12) United States Patent
Al-Sada

(10) Patent No.: US 12,053,723 B2
(45) Date of Patent: Aug. 6, 2024

(54) AUTOMATIC SAND FILTER SYSTEM CONTROLLER

(71) Applicant: Saudi Arabian Oil Company, Dhahran (SA)

(72) Inventor: Hussain Saud Al-Sada, Anak (SA)

(73) Assignee: Saudi Arabian Oil Company, Dhahran (SA)

( * ) Notice: Subject to any disclaimer, the term of this patent is extended or adjusted under 35 U.S.C. 154(b) by 709 days.

(21) Appl. No.: 17/187,216

(22) Filed: Feb. 26, 2021

(65) Prior Publication Data
US 2022/0274035 A1    Sep. 1, 2022

(51) Int. Cl.
| | | |
|---|---|---|
| *B01D 24/48* | (2006.01) | |
| *B01D 24/00* | (2006.01) | |
| *B01D 24/10* | (2006.01) | |
| *B01D 24/40* | (2006.01) | |
| *B01D 24/42* | (2006.01) | |
| *B01D 24/46* | (2006.01) | |
| *B01D 35/143* | (2006.01) | |
| *B01D 35/157* | (2006.01) | |

(Continued)

(52) U.S. Cl.
CPC ....... *B01D 24/4861* (2013.01); *B01D 24/002* (2013.01); *B01D 24/007* (2013.01); *B01D 24/105* (2013.01); *B01D 24/402* (2013.01); *B01D 24/425* (2013.01); *B01D 24/4636* (2013.01); *B01D 35/143* (2013.01); *B01D 35/1573* (2013.01); *C02F 1/004* (2013.01); *C02F 1/008* (2013.01); *G01M 13/003* (2019.01); *B01D 2101/04* (2013.01); *B01D 2201/54* (2013.01); *C02F 2201/005* (2013.01); *C02F 2209/006* (2013.01); *C02F 2209/40* (2013.01); *C02F 2303/16* (2013.01)

(58) Field of Classification Search
None
See application file for complete search history.

(56) References Cited

U.S. PATENT DOCUMENTS

| | | | | |
|---|---|---|---|---|
| 4,496,464 A | * | 1/1985 | Hensley | B01D 24/4642 |
| | | | | 210/792 |
| 2009/0123340 A1 | * | 5/2009 | Knudsen | G01N 33/18 |
| | | | | 73/61.41 |
| 2011/0168643 A1 | * | 7/2011 | Streng | B01D 24/4652 |
| | | | | 210/791 |

FOREIGN PATENT DOCUMENTS

KR    101320304 B1    10/2013

OTHER PUBLICATIONS

"Odyssey," Neptune Benson: an EVOQUA brand, 2017, 3 pages.
(Continued)

*Primary Examiner* — Richard C Gurtowski
(74) *Attorney, Agent, or Firm* — Fish & Richardson P.C.

(57) ABSTRACT

A system includes a sand filter disposed within a tank. A pipe connected to the tank is configured to flow fluid in or out of the tank. The system includes a valve configured to selectively allow fluid to flow through the pipe and a flowmeter configured to measure a flow rate of fluid through the pipe. An automatic control unit includes one or more processors and a non-transitory computer readable medium storing instructions executable by the one or more processors to perform operations including determining a debris accumulation status for the sand filter based in part on flow measurements from the flowmeter, and determining a failure status of the valve based in part on flow measurements from the flowmeter.

16 Claims, 5 Drawing Sheets

(51) Int. Cl.
*C02F 1/00* (2023.01)
*G01M 13/003* (2019.01)

(56) References Cited

OTHER PUBLICATIONS

"Tower-Flow Technical Report," Series TFB Water Filter Systems, Complete information for Engineering, Installation, Operation and Maintenance of Tower-Flo Series TFB Water Filter Systems, 2013, 36 pages.

Casciaro, "Sand Filter Automation," WT: Special Section, Oil & Gas, Mar./Apr. 2018, 3 pages.

* cited by examiner

AUTOMATIC SAND FILTER SYSTEM CONTROLLER

TECHNICAL FIELD

This disclosure relates to an automatic controller for a sand filter system.

BACKGROUND

Sand filter systems are used to clean contaminants from fluids. For example, sand filter systems can be used as a step in the water treatment process of water purification. Sand filter systems typically comprise a tank, one or more sand filter layers disposed in the tank, and one or a plurality of inlet pipes, outlet pipes, and/or other pipes or other conduits to flow unfiltered fluid into the tank and filtered fluid out of the tank or otherwise in, out of, or within the components of the sand filter system. Valves connected to the pipes or conduits can be configured to selectively allow fluid into or out of the system or portions of the system.

SUMMARY

This disclosure an automatic controller for a sand filter and related system and method.

Certain aspects of the subject matter herein can be implemented as a system including a sand filter disposed within a tank. A pipe connected to the tank is configured to flow fluid in or out of the tank. The system includes a valve configured to selectively allow fluid to flow through the pipe and a flowmeter configured to measure a flow rate of fluid through the pipe. An automatic control unit includes one or more processors and a non-transitory computer readable medium storing instructions executable by the one or more processors to perform operations including determining a debris accumulation status for the sand filter based in part on flow measurements from the flowmeter, and determining a failure status of the valve based in part on flow measurements from the flowmeter.

An aspect combinable with any of the other aspects can include the following features. The operations further include initiating a backwash of the tank in response to the determining of the debris accumulation status.

An aspect combinable with any of the other aspects can include the following features. Determining the failure status of the valve includes comparing the flow measurements to a threshold.

An aspect combinable with any of the other aspects can include the following features. The threshold is a non-zero threshold.

An aspect combinable with any of the other aspects can include the following features. The operations further include transmitting an alarm signal if the failure status of the valve is determined to be valve failure.

An aspect combinable with any of the other aspects can include the following features. The automatic control unit further includes a display screen, and transmitting the alarm signal includes displaying an alert on the display screen.

An aspect combinable with any of the other aspects can include the following features. The valve is a first valve of a plurality of valves. The operations further include identifying a failure status each of the plurality of valves, and transmitting an alarm signal which identifies which of the plurality of valves has a failure status of valve failure.

An aspect combinable with any of the other aspects can include the following features. Identifying the failure status of each of the plurality of valves includes transmitting signals to open and close each of the plurality of valves in sequence, and receiving, from the flowmeter, a flow rate of fluid through the pipe as each valve is opened and closed.

An aspect combinable with any of the other aspects can include the following features. The operations further include determining a least flow measurement corresponding to one of the plurality of valves as each valve is opened and closed.

An aspect combinable with any of the other aspects can include the following features. A valve having a failure status of value failure corresponds to the one of the plurality of valves having the least flow measurement.

Certain aspects of the subject matter herein can be implemented as a method including determining, by an automatic control unit comprising one or more processors and a non-transitory computer readable medium storing instructions executable by the one or more processors to perform operations, a debris accumulation status for a sand filter based in part on flow measurements from a flowmeter. The sand filter is disposed within a tank and is connected to a pipe configured to flow fluid in or out of the tank, and the flowmeter is configured to measure a flow rate of fluid through the pipe. The automatic control unit, based in part on flow measurements from the flowmeter, determines a failure status of a valve configured to selectively allow fluid to flow through the pipe.

An aspect combinable with any of the other aspects can include the following features. The automatic control unit initiates a backwash of the tank in response to the determining of the debris accumulation status.

An aspect combinable with any of the other aspects can include the following features. The automatic control unit determines the failure status of the valve by comparing the flow measurements to a threshold.

An aspect combinable with any of the other aspects can include the following features. The threshold is a non-zero threshold.

An aspect combinable with any of the other aspects can include the following features. The automatic control unit transmits an alarm signal if the failure status of the valve is determined to be valve failure.

An aspect combinable with any of the other aspects can include the following features. The automatic control unit includes a display screen. Transmitting the alarm signal includes displaying an alert on the display screen.

An aspect combinable with any of the other aspects can include the following features. The valve is a first valve of a plurality of valves. The automatic control unit identifies a failure status each of the plurality of valves and transmits an alarm signal which identifies which of the plurality of valves has a failure status of valve failure.

An aspect combinable with any of the other aspects can include the following features. Identifying the failure status of each of the plurality of valves includes the automatic control unit transmitting signals to open and close each of the plurality of valves in sequence, and receiving from a flowmeter a flow rate of fluid through the pipe as each valve is opened and closed.

An aspect combinable with any of the other aspects can include the following features. A least flow measurement is determined corresponding to one of the plurality of valves as each valve is opened and closed.

An aspect combinable with any of the other aspects can include the following features. A valve having a failure status of value failure corresponds to the one of the plurality of valves having the least flow measurement.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Sand filter systems are used to clean contaminants from water or other fluids. Sand filters typically include a filter layer composed of sand or multiple layers of sand (and/or gravel) of one or multiple sizes within a tank or other container. Unfiltered fluid is flowed into the tank, and suspended matter or other debris is removed from the fluid as it passes through the filter layers due to gravity or pressure. Some sand filter systems comprise multiple compartments and a plurality of valves and meters which control and monitor fluid input and output.

In accordance with some embodiments of the present disclosure, an automatic control unit for a sand filter system can be configured to automatically open or close valves as required for normal operations or for backwash or other cleaning or maintenance purposes and can monitor parameters such as flow rate and valve position.

In accordance with some embodiments of the present disclosure, the automatic control unit can be configured to receive measurements from flowmeters or other components and, by selectively configuring the valves, provide alerts to the operator regarding filter debris accumulation and automatically initiate a backwash in response. The automatic controller can also detect and alert the operator regarding valve failure (for example, valve leakage or failure to open or close) based on flowmeter measurements. Such valve failure detection from flowmeter data can be instead of, or in addition to, valve failure detection through traditional means such as limit switches. Limit switches can provide only limited information such as valve position and can be error-prone because the valve position indication from a limit switch may be incorrect due to mechanical failure of the valve or the limit-switch itself. In addition, installing limit switches or other valve monitoring devices on a multitude of valves can be cost-prohibitive. Thus, the system, apparatus, and method of the present disclosure provides a reliable and cost-effective means for controlling the sand filter system for normal and backwash operations and also for alerting the operator of valve leakage or other valve failure.

Figure 1:
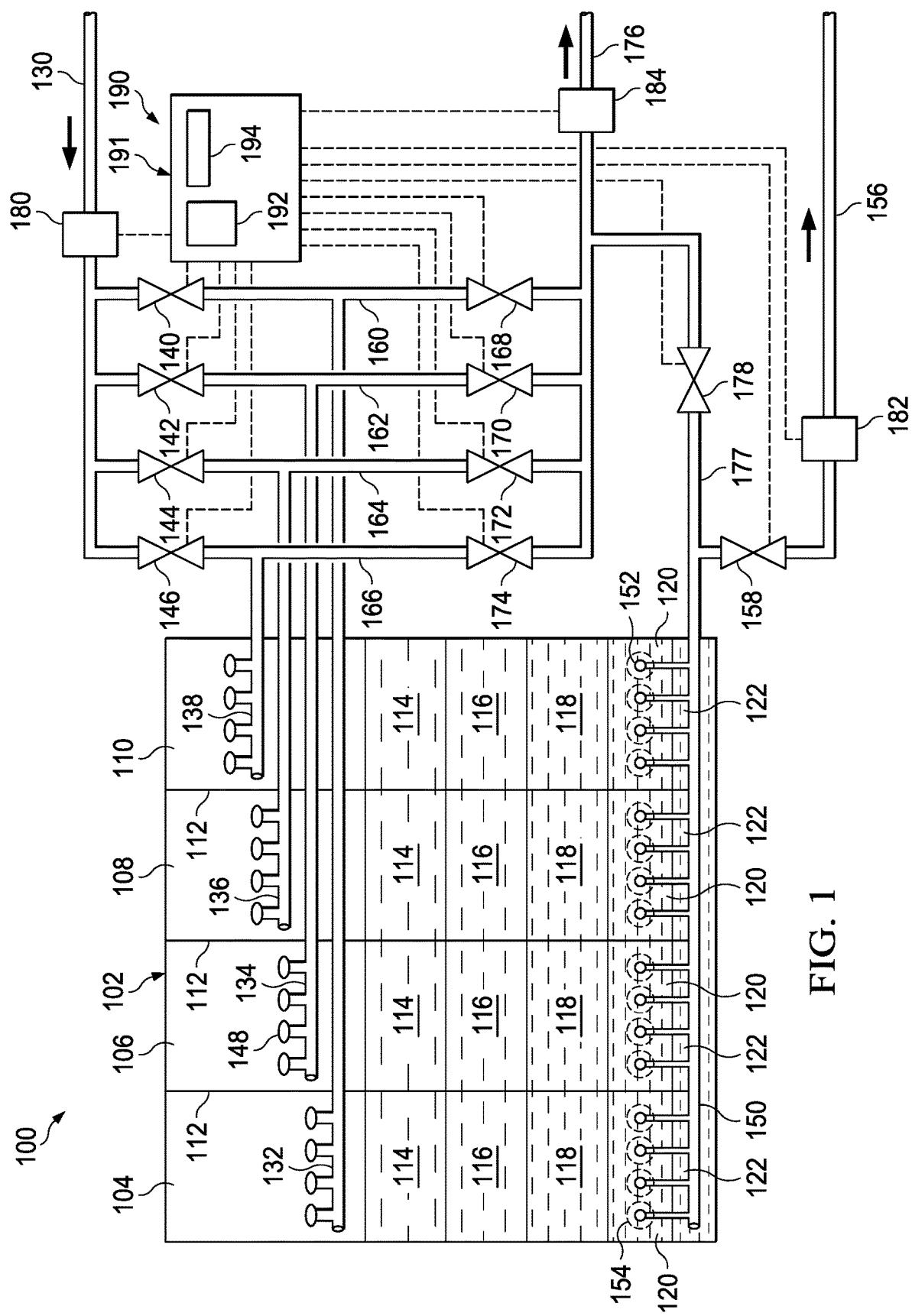
FIG. 1 is a drawing of a sand filter system with an automatic control unit in accordance with an embodiment of the present disclosure.

FIG. 1 is a drawing of a sand filter system with an automatic control unit in accordance with an embodiment of the present disclosure. In the illustrated embodiment, the input fluid to the system is unfiltered water and the output ("product") from the system is filtered water; however, in some embodiments of the present disclosure, the sand filter system can filter fluids other than water, such that the input fluid to the system is an unfiltered fluid (other than water or a mixture of water and other fluid(s)) and the output ("product") from the system is filtered fluid (other than water or a mixture of water and other fluid(s)).

System 100 includes a tank 102, which can comprise an enclosed tank composed of metal or another suitable material. In some embodiments, the interior of tank 102 can be a single compartment. In other embodiments, the interior of tank 102 can comprise a plurality of compartments. In the embodiment shown in FIG. 1, tank 102 includes four compartments: a first compartment 104, a second compartment 106, a third compartment 108, and a fourth compartment 110. Each compartment is separated by a compartment separation wall 112.

Each compartment of tank 102 is filled with a filter layer or layers. In the illustrated embodiment, each compartment of tank 102 includes a filter sand layer 114, a fine gravel layer 116, a medium gravel layer 118, and a course gravel layer 120. As described in further detail below, layers 114, 116, 118, and 120 serve to filter water or other fluid as it settles through the filter layers, thereby removing debris and other contaminants.

System 100 includes a main inlet pipe 130 which is configured to flow water to be filtered ("unfiltered water") to the tank 102. In the illustrated embodiment, before entering tank 102, main inlet pipe 130 splits into a plurality of feed pipes that are partially disposed within tank 102, and that are configured to flow unfiltered water into the individual compartments of the tank, above the filter layers. Specifically, in the illustrated embodiment, system 100 includes a first compartment feed pipe 132, which flows unfiltered water into first compartment 104, a second compartment feed pipe 134, which flows unfiltered water into second compartment 106, a third compartment feed pipe 136, which flows unfiltered water into third compartment 108, and a fourth compartment feed pipe 138, which flows unfiltered water into fourth compartment 110. A plurality of upper lateral pipes 148 are fluidically connected to the inlet feed pipes and distribute water from each of the feed pipes evenly across the top of the filter layers in each compartment.

System 100 comprises a plurality of valves, which can be pneumatic or air-operated valves (AOVs) operated by solenoids or other operation means, to selectively control the flow of water through the various pipes. For example, an inlet valve is positioned on each feed pipe to selectively allow unfiltered water through the respective feed pipe. Specifically, first inlet valve 140 selectively allows unfiltered water through first compartment feed pipe 132 and into first compartment 104. Second inlet valve 142 selectively allows unfiltered water through second compartment feed pipe 134 and into second compartment 106. Third inlet valve 144 selectively allows unfiltered water through third compartment feed pipe 136 and into third compartment 108. Fourth inlet valve 146 selectively allows unfiltered water through fourth compartment feed pipe 138 and into fourth compartment 110.

Bottom collection pipe 150 is disposed partially within tank 102, beneath filter layers 114, 116, 118, and 120, and is configured to flow water that has passed through the filter layers ("filtered water" or "product") out of tank 102. In the illustrated embodiment, a concrete layer 122 fills the bottom of each compartment beneath the filter layers and beneath compartment walls 112, and bottom collection pipe 150 is positioned within concrete layer 122 to carry filtered water from each compartment beneath compartment separation walls 112 and out of tank 102.

In the illustrated embodiment, a plurality of bottom lateral pipes 152 are connected to bottom collection pipe 150 and positioned within course gravel layer 120 to capture the filtered water and direct it to collection pipe 150. Each bottom lateral pipe 152 is surrounded by mesh 154 to prevent gravel filter material from entering lateral pipe 152.

As described in further detail below, as part of backwash or other operations, it is desirable in some circumstances to drain water (for example, unfiltered water or water from backwash operations) from one or more of inlet pipes 132, 134, 136, and/or 138. Drainage pipes 160, 162, 164, and 166 are fluidically connected to a respective each of the inlet pipes so as to effectuate this. In the illustrated embodiment, each of the drainage pipes 160, 162, 164, and 166 has a bypass drainage valve to selectively allow water from flow from the inlet pipes through the drainage pipes. Specifically, in the illustrated embodiment, first bypass drainage valve 168 selectively allows water to drain from first compartment inlet pipe 132 via first bypass drainage pipe 160. Second bypass drainage valve 170 selectively allows water to drain from second compartment inlet pipe 134 via second bypass drainage pipe 162. Third bypass drainage valve 172 selectively allows water to drain from third compartment inlet pipe 136 via third bypass drainage pipe 164. Fourth bypass drainage valve 174 selectively allows water to drain from fourth compartment inlet pipe 138 via fourth bypass drainage pipe 166. The bypass drainage pipes 160, 162, 164, and 166 collect in a common collecting drainage pipe 176, which, in some embodiments, can lead to a sewer or other appropriate disposal system.

In accordance with an embodiment of the present disclosure, downstream of where bottom collection pipe 150 exits tank 102, bottom collection pipe 150 splits into product outlet pipe 156 and rinse pipe 177. Product outlet valve 158 selectively allows water into product outlet pipe and rinse valve 178 selectively allows water into rinse pipe 177. Rinse pipe 177 connects to collecting drainage pipe 176.

In accordance with an embodiment of the present disclosure, inlet flowmeter 180 is disposed on or within main inlet pipe 130 and is configured to measure a flow rate of water through main inlet pipe 130. Product outlet flowmeter 182 is disposed on or within product outlet pipe 156 and is configured to measure a flow rate of filtered water through product outlet pipe 156. Bypass drainage flowmeter 184 is disposed on or within collecting drainage pipe 176 and is configured to measure a flow rate of water through collecting drainage pipe 176. In some embodiments, fewer or additional flowmeters can be disposed on or within the same or different locations within system 100.

Automatic control unit (ACU) 190 can include a computer system that comprises one or more processors, and a computer-readable medium (for example, a non-transitory computer-readable medium) storing computer instructions executable by the one or more processors to perform operations. In one embodiment, the computer system is based on an AT mega 2560 chip. The computer system is configured to receive commands from input interface 192 (which can comprise buttons or a touch interface) and signals from limit switches or other valve control devices and flow meters and to transmit signals to limit switches or other valve control devices and to screen 194. Screen 194 can comprise a liquid crystal display (LCD) screen or other suitable screen, and can display system mode or status, alert information, remaining time for next operations, and other information for the operator. In some embodiments, screen 194 can comprise a touch screen and act as both an input and output display device. ACU 190 also comprises a power source (not shown) which can include a 110 V AC to 5V DC converter. The computer system, input interface 192, screen 194, and other components of ACU 190 are held within a housing 191. Communications between ACU 190 and valves, flowmeters, and other components of system 100 can be via wired and/or wireless connections.

For normal operation mode, ACU 190 can be configured to transmit signals to open inlet valves 140, 142, 144, and 146 and product outlet valve 158, and to close bypass drainage valves 168, 170, 172, and 174 and rinse valve 178. In such configuration, unfiltered water flows into the system 100 via main inlet pipe 130 and through each of compartment feed pipes 132, 134, 136, and 138 into each of compartments 104, 106, 108, and 110. Within each compartment, gravity causes the water to flow through each of filter layers 114, 116, 118, and 120, which remove particulates and other contaminants from the water as it passes through. Filtered water flows into bottom lateral pipes 152 and thence into bottom collection pipe 150. After exiting tank 102, filtered (clean) water flows from collection pipe 150 into product outlet pipe 156 and out of the system 100.

Over time, filter layers 114, 116, 118, and 120 can become clogged as debris such as particulate matter and/or other contaminants accumulates on or within the filter layers, causing the filtering process to be less effective and/or efficient and/or reducing the rate at which water is filtered by the system. A backwash process can act to dislodge the particulate matter from the filters and refresh the system. In the illustrated embodiment, the backwash process can be accomplished separately for each compartment 104, 106, 108, and 110. For example, to initiate a backwash of first compartment 104, ACU 190 transmits signals to close product outlet valve 158 (such that both product outlet valve 158 and rinse valve 178 are closed) and to close first inlet valve 140 (while the other inlet valves 142, 144, and 146 remain open) and to open first bypass drainage valve 168. In such a configuration, water will flow upwards through first compartment 104, dislodging debris from the filter layers in that compartment, and out of tank 102 (carrying said debris) via first inlet pipe 132 and thence through first bypass drainage pipe 160 and into collecting drainage pipe 176. Once first compartment 104 is sufficiently backwashed (which can be based on a pre-set time period for backwash and/or determined by analysis of whether the water flowing through drainage pipe 176 is substantially free of contaminants), first bypass drainage valve 168 can be closed and first inlet valve 140 opened. Next, to backwash second compartment 106, ACU 190 transmits signals to close second inlet valve 142 and to open second bypass drainage valve 170. In such a configuration, water will flow upwards through second compartment 106, dislodging debris from the filter layers in that compartment, and out of tank 102 (carrying said debris) via second inlet pipe 134 and thence through second bypass drainage pipe 162 and into collecting drainage pipe 176. Once second compartment 106 is sufficiently backwashed, second bypass drainage valve 170 can be closed and second inlet valve 142 opened. In a similar manner, third compartment 108 and fourth compartment 110 can also be backwashed, such that each of compartments 104, 106, 108, and 110 can be individually backwashed in sequence.

After the backwash sequences are completed for each compartment, ACU 190 can transmits a signal to open rinse valve 178 so as to again allow flow downward through compartments 104, 106, 108, and 110 and out rinse pipe 177 so as to rinse the filter layers before returning to normal operations mode. After rinsing is complete (which can be based on a pre-set time period for backwash and/or determined by analysis of whether the water flowing through rinse pipe 177 is substantially free of contaminants), ACU 190 can transmit signals to close rinse valve 178 and open product outlet valve 158, and normal operations can continue.

ACU 190 can be configured to, during normal operations, receive measurements from input flowmeter 180 of the flow rate through main inlet pipe 130 and from product flowmeter 182 of the flow rate through product outlet pipe 156. A decrease in the flow rates can indicate an increase in the differential pressure of water through the filter system. A high differential pressure can be caused by debris accumulation in the filters, indicating that a backwash sequence to clear out the debris would be desirable. In an embodiment of the present disclosure, ACU 190 can be programmed to determine the debris accumulation status by comparing the flow rate to a threshold flow rate, where the threshold flow rate reflects sufficient debris build-up to warrant a backwash. As described in more detail in reference to FIGS. 2A and 2B, if the flow rate drops below the threshold, ACU 190 can transmit an alert signal to LCD screen 194. In some embodiments, the alert signal can instead or in addition be an audible signal or a signal sent wirelessly to operator tablets or phones or other monitoring devices. In some embodiments, ACU 190 can be configured to automatically initiate a backwash sequence (such as the backwash sequence described above) in response to the flow rate dropping below the threshold, instead of or in addition to sending the alert, and to return system 100 to the normal operations configuration after backwash and rinsing is complete.

In some embodiments of the present disclosure, ACU 190 can also use flowmeter data to test system valves and alert the operator in the event a valve failure is determined or indicated, so that valve replacement or other corrective action or investigation can be taken or initiated. Accordingly, in some embodiments of the present disclosure, data from the same flowmeter can be used by ACU 190 as a basis for determining a debris accumulation status of the filter (i.e., whether a backwash is warranted) and also as a basis for determining a valve failure status (i.e., valve failure detection). Such valve failure status determination using flowmeter data can be instead of (or in addition to) methods or systems of valve failure status determination that use other measurements or information, for example, limit switch position information.

Figure 2A:
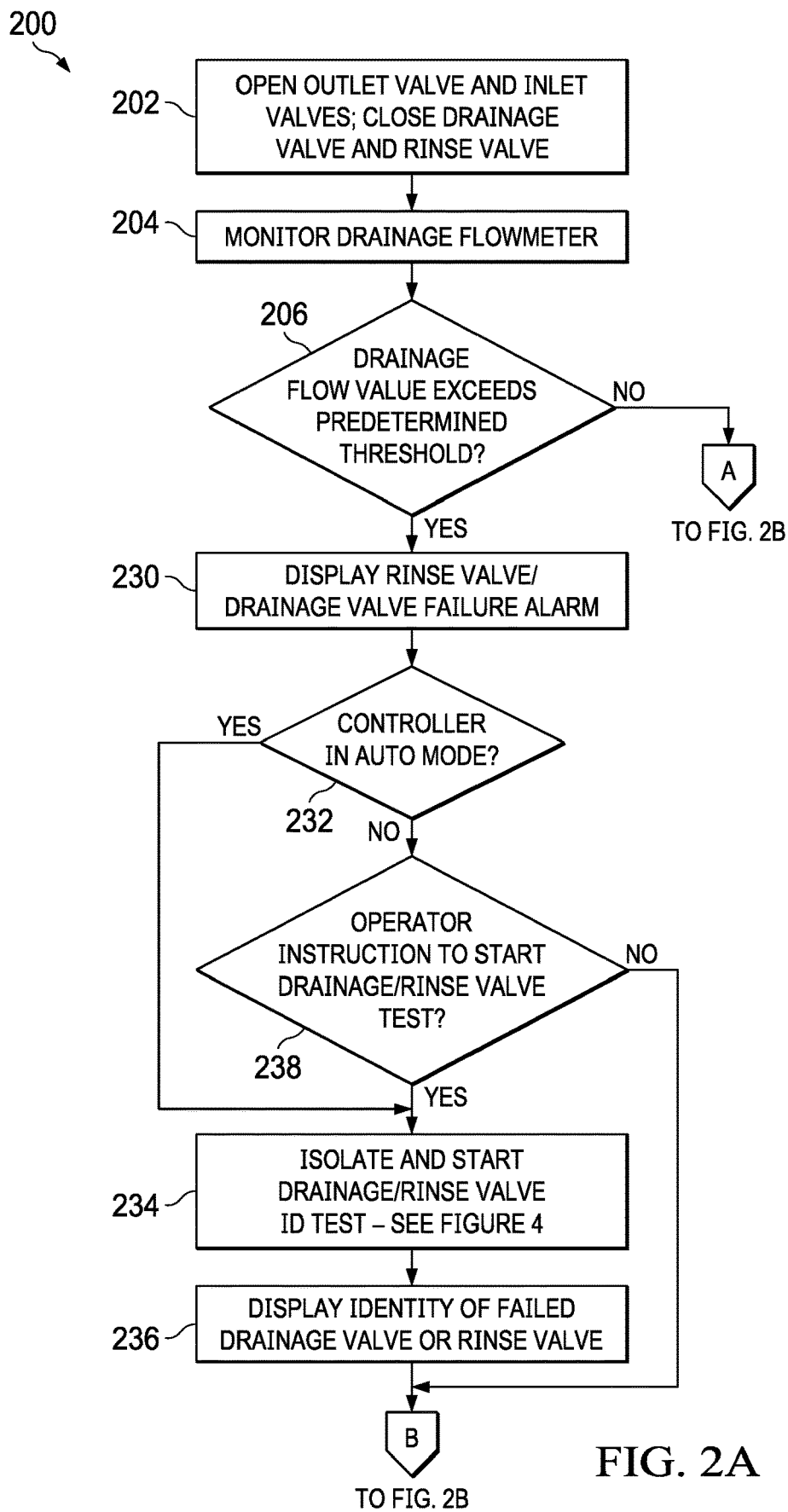
FIGS. 2A and 2B are a process flow diagram of a method for determining a debris accumulation status for the sand filter, and for determining a failure status of a valve, based in part on flow measurements from a flowmeter, in accordance with an embodiment of the present disclosure.
Figure 2B:
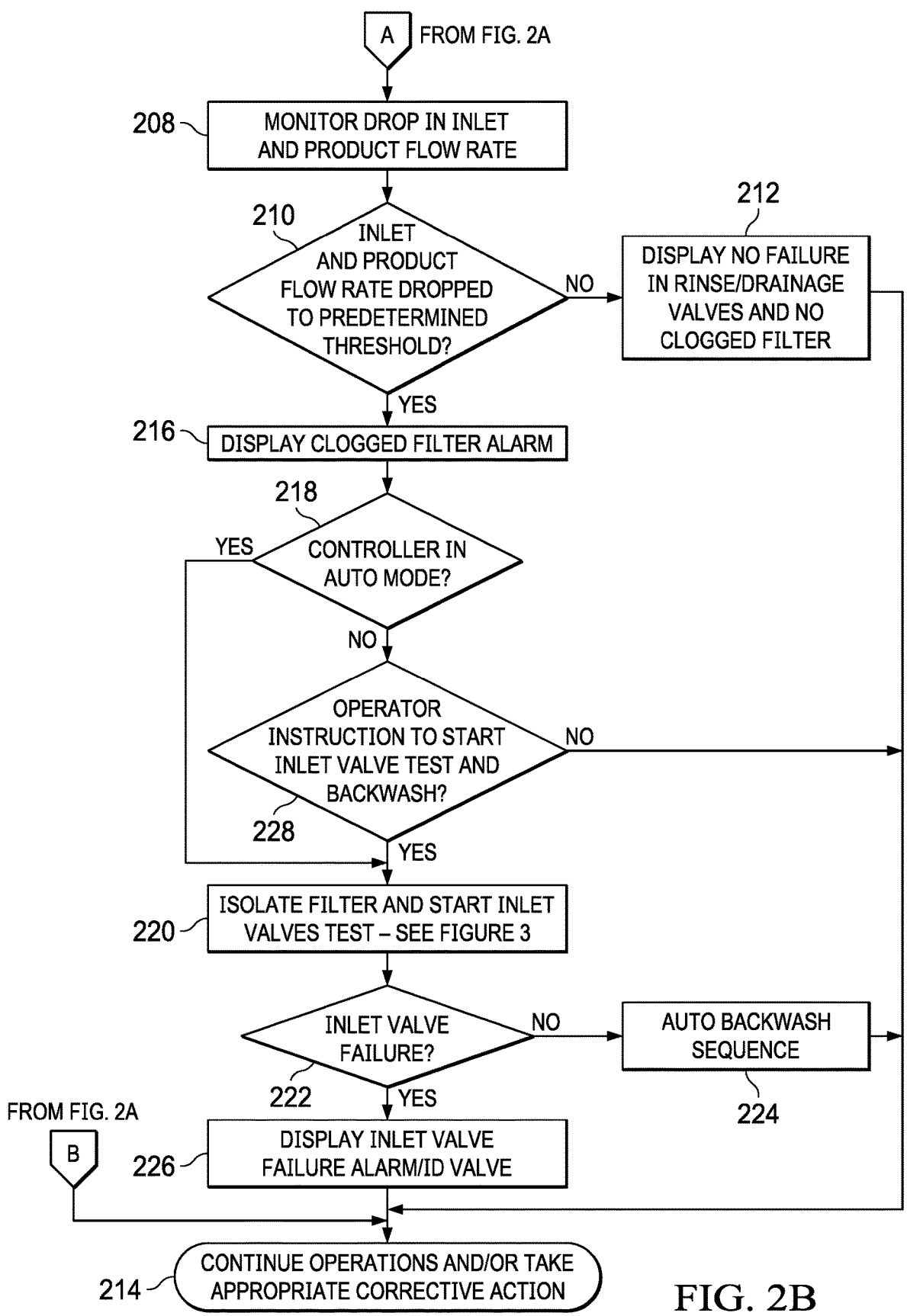

FIGS. 2A and 2B are a process flow diagram of a method for determining a debris accumulation status for the sand filter, and for determining a failure status of a valve, based in part on flow measurements from a flowmeter, in accordance with an embodiment of the present disclosure. The method 200 of FIGS. 2A and 2B can be applied to, and will be described in reference to, the system 100 illustrated in FIG. 1. However, in some embodiments, some or all of the steps of method of FIGS. 2A and 2B can be applied to other sand filter systems.

In accordance with the method 200 shown in FIGS. 2A and 2B, the method begins at step 202 of FIG. 2A, starting with the system 100 in a normal operational configuration as described above, with inlet valves 140, 142, 144, and 146 and product outlet valve 158 open and bypass drainage valves 168, 170, 172, and 174 and rinse valve 178 closed, such that unfiltered water flows into tank 102 via main inlet pipe 130 and through each of compartment feed pipes 132, 134, 136, and 138 into each of compartments 104, 106, 108, and 110, and filtered water flows out of the tank via bottom collection pipe 150 and out of system 100 via product outlet pipe 156.

At step 204, ACU 190 receives flow rate measurements from drainage flowmeter 184. Because bypass drainage valves 168, 170, 172, and 174 and rinse valve 178 are closed, drainage flowmeter 184 should read no or very little flow. However, if drainage valves 168, 170, 172, and 174 and rinse valve 178 fail because, for example, they did not properly close (in spite of close signal from ACU 190) and/or are leaking because of mechanical or other failure, significant water may continue to flow through drainage pipe 176 and would be measured by drainage flowmeter 184.

ACU 190 can be programmed with a threshold based on expected flow rates in bypass drainage configuration, assuming drainage valves 168, 170, 172, and 174 and rinse valve 178 are operating properly and not leaking (or only leaking an acceptable amount). In one embodiment, the threshold can be zero. In other embodiments, the threshold can be a non-zero amount based upon an acceptable or expected amount of leakage based on the age, type, or other characteristic of the valve(s). At step 206, ACU 190 compares the flow rate measurement received at step 204 to the threshold to determine the failure status of the valves.

If at step 206 the flow rate does not exceed the threshold (indicating no failure of drainage valves 168, 170, 172, and 174 or rinse valve 178), then the method proceeds to step 208 (FIG. 2B) and ACU 190 receives flow rate measurements from inlet flowmeter 180 and outlet flowmeter 182. At step 210, ACU 190 determines the debris accumulation status by determining if the flow measurements have dropped below a threshold indicating a clogged (or sufficiently clogged) filter, such that a backwash is warranted. If not, then the method proceeds to step 212, wherein ACU 190 transmits a signal to LCD screen 194 to display the valve failure status and the debris accumulation status; i.e., no rinse or drainage valve failure and filter not clogged (or not clogged enough to warrant backwash). The method then proceeds to end step 214, wherein the system can continue with normal operations by, for example, returning to step 204.

Returning to step 210, if ACU 190 determines that the inlet and outlet flow measurements from inlet flowmeter 180 and outlet flowmeter 182 have dropped below the threshold indicating that the filter is sufficiently clogged to warrant a backwash, i.e., that the debris accumulation status is a clogged filter, then, at step 216, ACU 190 transmits an alert signal to LCD screen 194. In some embodiments, the alert signal can instead (or in addition) be an audible signal or a signal sent wirelessly to operator tablets or phones or other monitoring devices.

In the embodiment illustrated in FIGS. 2A and 2B, ACU 190 has an automatic mode and a manual mode. If at step 218 ACU 190 is in automatic mode, then the method proceeds to step 220 wherein ACU 190 initiates an inlet filter status test. The inlet filter status test is described in more detail in reference to FIG. 3. At step 222, if the inlet filter status test indicates a failure of an inlet valve, then the method proceeds to step 226 wherein ACU 190 transmits an alert signal indicating a failure of an inlet valve and identifying which valve has failed. Appropriate further investigation or corrective action (such as valve replacement) based on the valve failure alert can be initiated. Such further investigation or action can range from merely noting the failure alert for future investigation to a full valve replacement. The method then continues to end step 214 wherein the system can continue with operations (by, for example, returning to step 204) or the operator can take other action as warranted.

If at step 222 the inlet status test does not indicate any valve failure, then the method proceeds to step 224 wherein ACU 190 configures system 100 to initiate and complete a backwash sequence, as described above in reference to FIG. 1. At the end of step 224, i.e., after the backwash has been performed, ACU 190 returns system 100 to normal operational configuration by transmitting signals to open inlet valves 140, 142, 144, and 146 and product outlet valve 158 and to close bypass drainage valves 168, 170, 172, and 174 and the method proceeds to step 214 wherein normal operations can continue (by, for example, returning to step 204) or other appropriate action can be taken.

Returning to step 218, if ACU 190 is in manual mode, then the method proceeds to step 228 and ACU 190 does not automatically initiate any further valve tests or backwash operations without instructions from the operator. If at step 228 the operator does input such instructions, then the method proceeds to step 220 as described above. If such input is not received, then the method continues to end step 214 wherein the system can continue with operations (by, for example, returning to step 204) or the operator can take other action as warranted.

In some embodiments, measurements of the flowmeters as described in reference to the above steps 204 and 208 can occur continuously in parallel instead of, or in addition to, in sequence. In some embodiments, ACU 190 can (for example, at step 218) initiate a backwash sequence without first conducting an inlet valve test, and can either forego the inlet valve test or conduct the inlet valve test after the backwash sequence has been completed.

Returning to step 206 of FIG. 2A, if the flow rate measured by drainage flowmeter 184 exceeds the threshold, then ACU 190 recognizes a valve failure as the failure status (meaning one or more of drainage valves 168, 170, 172, and 174 or rinse valve 178 is leaking) and, at step 230, ACU 190 transmits an alert signal to LCD screen 194 indicating that a drainage valve or the rinse valve has failed. Proceeding to step 232, if ACU 190 is in automatic mode, then the method proceeds to step 234 and ACU 190 initiates a drainage/rinse filter identification test. The drainage/rinse filter identification test is described in more detail in reference to FIG. 4. At the completion of the drainage/rinse valve identification test at step 234, ACU 190 transmits a signal at step 236 to display 194 identifying which valve has failed. Appropriate further investigation or corrective action (such as valve replacement) based on the valve failure alert can initiated. Such further investigation or action can range from merely noting the failure alert for future investigation to a full valve replacement. The method then continues to end step 214 (FIG. 2B) wherein the system can continue with operations (by, for example, returning to step 204) or the operator can take other action as warranted.

Returning to step 232 of FIG. 2A, if ACU 190 is in manual mode, then the method proceeds to step 238 and ACU 190 does not automatically initiate any further valve tests without instructions from the operator. If at step 238 the operator does input such instructions, then the method proceeds to step 234 as described above. If such input is not received, then the method continues to end step 214 (FIG. 2B) wherein the system can continue with operations (by, for example, returning to step 204 of FIG. 2A) or the operator can take other action as warranted.

Figure 3:
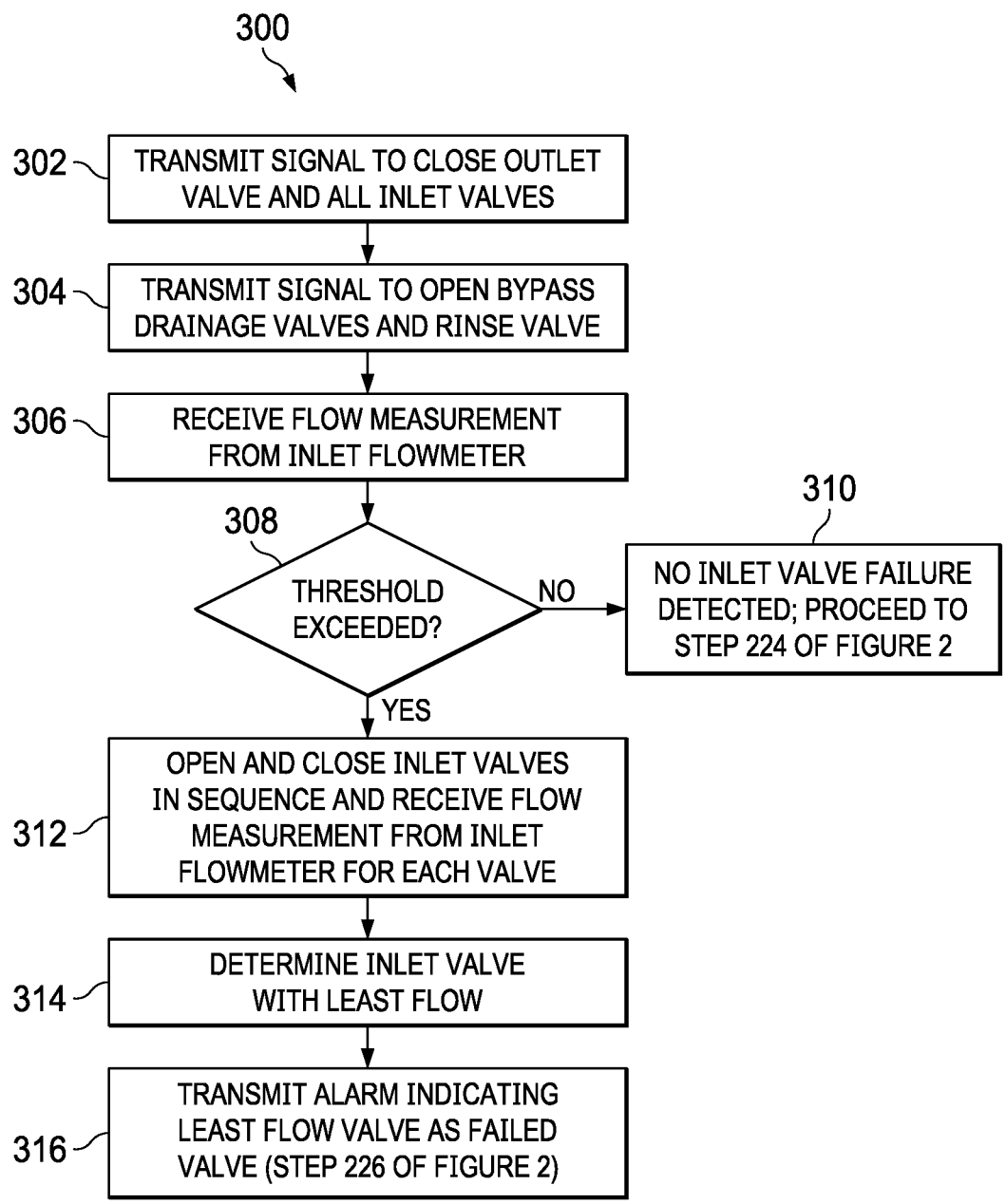
FIG. 3 is a process flow diagram of a method for isolating and detecting an inlet valve failure status in accordance with an embodiment of the present disclosure.

FIG. 3 is a process flow diagram of a method 300 for isolating and detecting an inlet valve failure status in accordance with an embodiment of the present disclosure. In some embodiments, the method of FIG. 3 corresponds to step 220 of FIG. 2B and is initiated automatically by ACU 190 after a clogged filter alarm; i.e., after steps 216 and 218, and/or manually initiated by the operator. In some embodiments, the method of FIG. 3 can be conducted at other suitable points in method 200 or otherwise during operations of system 100 or another suitable sand filter system.

Method 300 begins at step 302, wherein ACU 190 transmits signals to close outlet valve 158 and inlet valves 140, 142, 144, and 146. Proceeding to step 304, ACU 190 transmits signals to open bypass drainage valves 168, 170, 172, and 174 and rinse valve 178.

In such bypass drainage mode, no water should be entering tank 102 from feed pipes 132, 134, 136, and 138, and, after the small amount of existing water that is in feed pipes 132, 134, 136, and 138 rapidly drains out drainage pipes 160, 162, 164, and 166 and the system equilibrates, no water (or only a small amount of water) should be flowing through inlet pipe 130 or collecting drainage pipe 176.

Proceeding to step 306, ACU 190 receives flowmeter measurements from inlet flowmeter 180. ACU 190 can be programmed with a threshold based on expected flow rates, assuming inlet valves 140, 142, 144, and 146 are operating properly and not leaking (or only leaking an acceptable amount). In one embodiment, the threshold can be zero. In other embodiments, the threshold can be a non-zero amount based upon an acceptable or expected amount of leakage based on the age, type, or other characteristic of the valve. At step 308, ACU 190 compares the flow rate measurement received at step 306 to the threshold to determine the failure status of the valve. If the flow rate does not exceed the threshold, then no inlet valve failure has been detected. Step 308 of method 300 can correspond to step 222 of method 200 of FIG. 2B; i.e., if no inlet valve failure is detected, then method 200 can proceed to step 224 of method 200 (backwash sequence).

If the flow rate received at step 306 does exceed the threshold at step 308, then method 300 proceeds to step 312. At step 312, ACU 190 transmits signals to open and close each of inlet valves 140, 142, 144 and 146 in sequence. In an embodiment, each of the inlet valves can be opened for a few seconds, or a minute, or another suitable period to allow for an accurate measurement of flow from each individual valve. ACU 190 continues to receive flow measurements from inlet flowmeter 180 while each inlet valve is opened and closed. If each of valves 140, 142, 144 and 146 is functioning properly and closing completely in response to the close signals from ACU 190, then inlet flowmeter 180 should measure a flow rate corresponding to the flow capacity of the individual valve when the valve is opened. Each of inlet valves 140, 142, 144, and 146 has a flow capacity when open. For example, in an embodiment of the present disclosure, the flow capacity of each inlet valve is approximately 200 gallons per minute (GPM). In the embodiment when the flow capacity of each of the inlet valves is approximately 200 GPM, then the measurement from flowmeter 180 should be approximately 200 GPM from each inlet valve as each valve is opened. However, if one of the inlet valves is not closing properly (i.e., is leaking), then inlet flowmeter 180 will measure a greater amount of flow corresponding to the flow from the leaking (non-fully-closing) valve. For example, if inlet valve 142 is not properly closing and is leaking approximately 50 GPM after ACU 190 transmits a close signal to inlet valve 142, then each flow measurement at flowmeter 180 from the period when each of other valves is individually open will be approximately 250 GPM (i.e., 200 GPM from the open valve plus 50 GPM from faulty, leaking valve 142). However, during the period when leaking inlet valve 142 is the only valve open, then the flow measurement from flowmeter 180 will be 200 GPM. At step 314, ACU 190 determines the valve with the lowest flow measurement (in this example, inlet valve 142) and identifies this valve as the faulty valve. At step 316, ACU 190 transmits an alert signal to LCD screen 194 identifying the faulty valve. Step 316 of method 300 of FIG. 3 corresponds to step 226 of method 200 of FIG. 2B.

Figure 4:
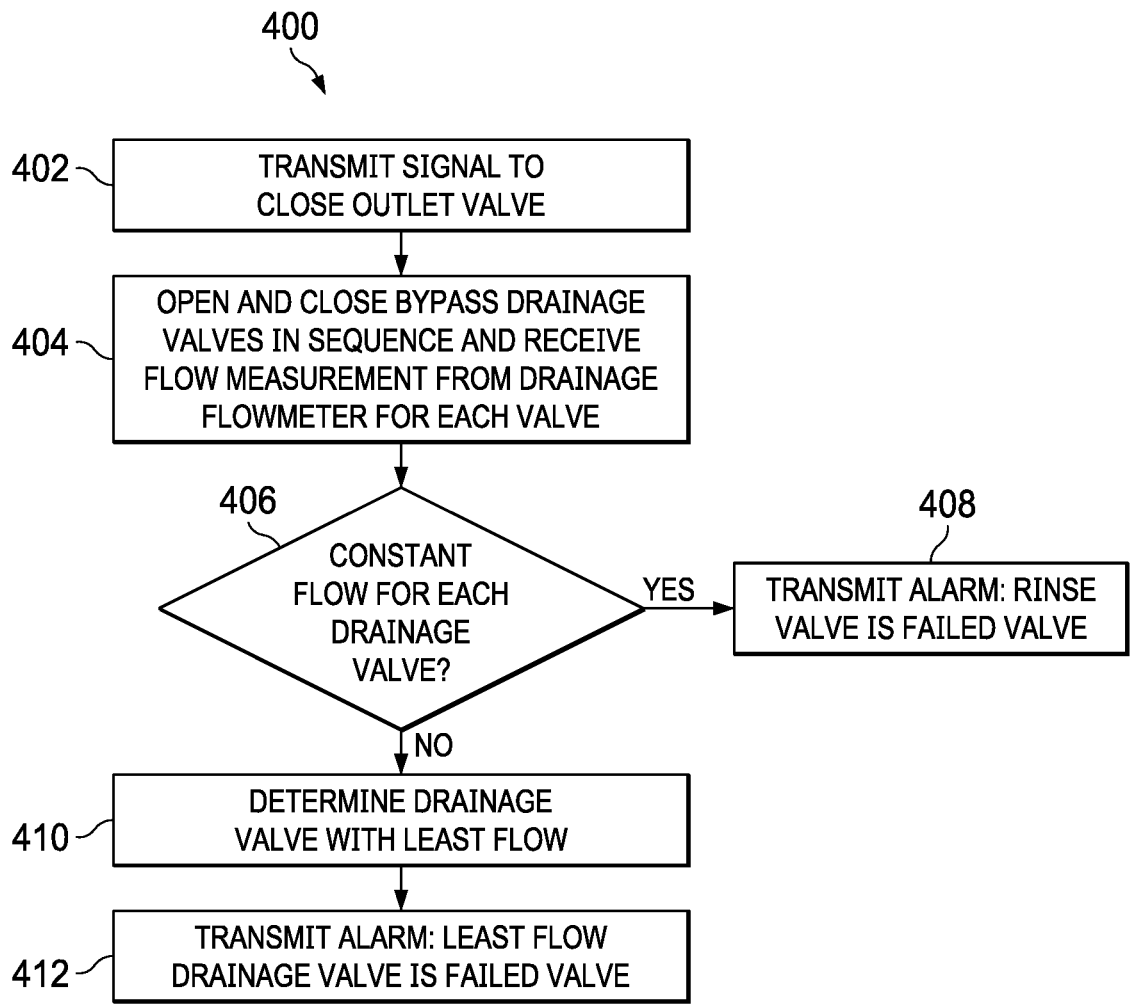
FIG. 4 is a process flow diagram of a method for identifying a drainage and/or rinse valve that has failed in accordance with an embodiment of the present disclosure.

FIG. 4 is a process flow diagram of a method for identifying a drainage and/or rinse valve that has failed in accordance with an embodiment of the present disclosure. In some embodiments, the method of FIG. 4 corresponds to step 234 of FIG. 2A and is initiated automatically by ACU 190 after it is determined (at step 206) that the drainage flowmeter measurement exceeds the threshold and a rinse valve/drainage valve failure alarm has been displayed. In some embodiments, the method of FIG. 4 can be conducted at other suitable points in method 200 or otherwise during operations of system 100 or another suitable sand filter system.

Method 400 begins at step 402, wherein ACU 190 transmits signals to close outlet valve 158 while all inlet valves (140, 142, 144, and 146) remain open and drainage valves 160, 162, 164, and 166 and rinse valve 178 remain closed. Proceeding to step 404, ACU 190 transmits signals to open and close each of drainage valves 160, 162, 164 and 166 in sequence. In an embodiment, each of the drainage valves can be opened for a few seconds or a minute or another suitable period to allow for an accurate measurement of flow from each individual valve. ACU 190 continues to receive flow measurements from drainage flowmeter 184 while each drainage valve is opened and closed. If each of valves 160, 162, 164 and 166 is functioning properly and closing completely in response to the close signals from ACU 190, then drainage flowmeter 184 should measure the same (or substantially the same) flow rate corresponding to the flow capacity of the individual valve when the valve is opened. At step 406, ACU 190 determines if the flow rate measured from drainage flowmeter 184 for each drainage valve opened-and-closed in sequence is the same or substantially the same. If so, then this indicates that any excess flow (for example, the excess flow resulting in the drainage flowmeter exceeding the threshold in step 206 of method 200 of FIGS. 2A and 2B) is attributable to a leaking rinse valve 178 rather than one of the drainage valves and the method proceeds to step 408 wherein ACU 190 transmits an alarm indicating that rinse valve 178 is a failed (leaking) valve. If at step 406 ACU 190 determines that flow rate measured from drainage flowmeter 184 for each drainage valve opened-and-closed in sequence is not substantially the same, then the method proceeds to step 410 wherein ACU 190 determines which of the drainage valves 160, 162, 164 and 166 corresponds to the least flow. For example, in an embodiment when the flow capacity of each of the drainage valves is approximately 200 GPM, then the measurement from drainage flowmeter 184 should be approximately 200 GPM from each drainage valve as each valve is opened. However, if one of the inlet valves is not closing properly (i.e., is leaking), then drainage flowmeter 184 will measure a greater amount of flow corresponding to the flow from the leaking (non-fully-closing) valve. For example, if drainage valve 164 is not properly closing and is leaking approximately 50 GPM after ACU 190 transmits a close signal to inlet valve 164, then each flow measurement at flowmeter 184 from the period when each of other valves is individually open will be approximately 250 GPM (i.e., 200 GPM from the open valve plus 50 GPM from faulty, leaking valve 164). However, during the period when leaking drainage valve 164 is the only valve open, then the flow measurement from drainage flowmeter 184 will be 200 GPM. At step 410, ACU 190 determines the valve with the lowest flow measurement (in this example, drainage valve 164) and, at step 412, transmits an alarm which identifies this valve as the faulty valve. Step 412 of method 400 of FIG. 4 can correspond to step 236 of method 200 of FIG. 2A.

In this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In this disclosure, "approximately" or "substantially" means a deviation or allowance of up to 10 percent (%) and any variation from a mentioned value is within the tolerance limits of any machinery used to manufacture the part. Likewise, "about" can also allow for a degree of variability in a value or range, for example, within 10%, within 5%, or within 1% of a stated value or of a stated limit of a range.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

While this disclosure contains many specific implementation details, these should not be construed as limitations on the subject matter or on what may be claimed, but rather as descriptions of features that may be specific to particular implementations. Certain features that are described in this disclosure in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Nevertheless, it will be understood that various modifications, substitutions, and alterations may be made. While operations are depicted in the drawings or claims in a particular order, this should not be understood as requiring that such operations be performed in the particular order shown or in sequential order, or that all illustrated operations be performed (some operations may be considered optional), to achieve desirable results. Accordingly, the previously described example implementations do not define or constrain this disclosure.

What is claimed is:

1. A system comprising:
   a sand filter disposed within a tank;
   a pipe connected to the tank and configured to flow fluid in or out of the tank;
   a valve configured to selectively allow fluid to flow through the pipe;
   a flowmeter configured to measure a flow rate of fluid through the pipe; and
   an automatic control unit comprising one or more processors and a non-transitory computer readable medium storing instructions executable by the one or more processors to perform operations, the operations comprising:
      transmitting signals to switch the valve between an open position and a closed position;
      after transmitting a signal to switch the valve to the open position, determining a debris accumulation status for the sand filter based in part on a determination by the automatic control unit of whether a flow rate measured with the flowmeter is below a threshold flow rate corresponding to an expected flow rate through the sand filter having a specified degree of debris accumulation; and
      after transmitting a signal to switch the valve to the closed position, determining a failure status of the valve based in part on a determination by the automatic control unit of whether a flow rate measured with the flowmeter is above a non-zero threshold flow rate corresponding to an expected leakage of the valve.

2. The system of claim 1, wherein the operations further comprise initiating a backwash of the tank in response to the determining of the debris accumulation status.

3. The system of claim 1, wherein the operations further comprise transmitting an alarm signal if the failure status of the valve is determined to be valve failure.

4. The system of claim 3, wherein the automatic control unit further comprises a display screen, and wherein transmitting the alarm signal comprises displaying an alert on the display screen.

5. The system of claim 1, wherein the valve is a first valve of a plurality of valves, and wherein the operations further comprise
   identifying a failure status each of the plurality of valves; and
   transmitting an alarm signal which identifies which of the plurality of valves has a failure status of valve failure.

6. The system of claim 5, wherein identifying the failure status of each of the plurality of valves comprises:
   transmitting signals to open and close each of the plurality of valves in sequence; and
   receiving, from the flowmeter, a flow rate of fluid through the pipe as each valve is opened and closed.

7. The system of claim 6, wherein the operations further comprise determining a least flow measurement corresponding to one of the plurality of valves as each valve is opened and closed.

8. The system of claim 7, wherein a valve having a failure status of value failure corresponds to the one of the plurality of valves having the least flow measurement.

9. A method comprising:
   transmitting, by an automatic control unit comprising one or more processors and a non-transitory computer readable medium storing instructions executable by the one or more processors to perform operations, signals to a valve of a system comprising:
      a sand filter disposed within a tank;
      a pipe connected to the tank and configured to flow fluid in or out of the tank;
      a flowmeter configured to measure a flow rate of fluid through the pipe, wherein the valve is configured to selectively allow fluid to flow through the pipe, and wherein the signals comprise signals to switch the valve between an open position and a closed position;
   after transmitting a signal to switch the valve to the open position, determining, by the automatic control unit a debris accumulation status for the sand filter based in part on a determination by the automatic control unit of whether a flow rate measured with the a flowmeter is below a threshold flow rate corresponding to an expected flow rate through the sand filter having a specified degree of debris accumulation; and
   after transmitting a signal to switch the valve to the closed position, determining, by the automatic control unit and based in part on a determination by the automatic control unit of whether a flow rate measured with the flowmeter is above a non-zero threshold flow rate corresponding to an expected leakage of the valve, a failure status of the valve.

10. The method of claim 9, further comprising initiating, by the automatic control unit, a backwash of the tank in response to the determining of the debris accumulation status.

11. The method of claim 9, further comprising transmitting, by the automatic control unit, an alarm signal if the failure status of the valve is determined to be valve failure.

12. The method of claim 11, wherein the automatic control unit further comprises a display screen, and wherein transmitting the alarm signal comprises displaying an alert on the display screen.

13. The method of claim 9, wherein the valve is a first valve of a plurality of valves, and further comprising:
   identifying, by the automatic control unit, a failure status each of the plurality of valves; and
   transmitting, by the automatic control unit, an alarm signal which identifies which of the plurality of valves has a failure status of valve failure.

14. The method of claim 13, wherein identifying the failure status of each of the plurality of valves comprises:
   transmitting, by the automatic control unit, signals to open and close each of the plurality of valves in sequence; and
   receiving, by the automatic control unit and from a flowmeter, a flow rate of fluid through the pipe as each valve is opened and closed.

15. The method of claim 14, further comprising determining a least flow measurement corresponding to one of the plurality of valves as each valve is opened and closed.

16. The method of claim 15, wherein a valve having a failure status of value failure corresponds to the one of the plurality of valves having the least flow measurement.

* * * * *

UNITED STATES PATENT AND TRADEMARK OFFICE
CERTIFICATE OF CORRECTION

| | | |
|---|---|---|
| PATENT NO. | : 12,053,723 B2 | Page 1 of 1 |
| APPLICATION NO. | : 17/187216 | |
| DATED | : August 6, 2024 | |
| INVENTOR(S) | : Hussain Saud Al-Sada | |

It is certified that error appears in the above-identified patent and that said Letters Patent is hereby corrected as shown below:

In the Claims

Column 14, Line 22, Claim 9, please replace "the a flowmeter" with -- the flowmeter --.

Signed and Sealed this
Eighth Day of October, 2024

Katherine Kelly Vidal
*Director of the United States Patent and Trademark Office*